(12) United States Patent
Foley et al.

(10) Patent No.: US 9,268,640 B1
(45) Date of Patent: Feb. 23, 2016

(54) LIMITING DATA LOSS ON PARITY RAID GROUPS

(71) Applicant: EMC Corporation, Hopkinton, MA (US)

(72) Inventors: Robert P. Foley, Clinton, MA (US); Ronald D. Proulx, Boxborough, MA (US); Marc C. Cassano, Medway, MA (US)

(73) Assignee: EMC Corporation, Hopkinton, MA (US)

( * ) Notice: Subject to any disclaimer, the term of this patent is extended or adjusted under 35 U.S.C. 154(b) by 125 days.

(21) Appl. No.: 14/137,759

(22) Filed: Dec. 20, 2013

(51) Int. Cl.
*G06F 11/00* (2006.01)
*G06F 11/10* (2006.01)

(52) U.S. Cl.
CPC .................................. *G06F 11/1084* (2013.01)

(58) Field of Classification Search
CPC .................................................. G06F 11/1084
See application file for complete search history.

(56) References Cited

U.S. PATENT DOCUMENTS

| | | | | |
|---|---|---|---|---|
| 5,913,927 | A * | 6/1999 | Nagaraj et al. | 714/6.13 |
| 6,944,791 | B2 * | 9/2005 | Humlicek | G06F 11/1076 714/6.22 |
| 8,417,987 | B1 * | 4/2013 | Goel | G06F 11/1076 714/6.1 |
| 8,700,950 | B1 * | 4/2014 | Syu | 714/6.24 |
| 9,058,261 | B1 * | 6/2015 | Jean et al. | |
| 2006/0149999 | A1 * | 7/2006 | Hung | 714/6 |
| 2012/0303893 | A1 * | 11/2012 | Benhase et al. | 711/114 |
| 2014/0337684 | A1 * | 11/2014 | Resch et al. | 714/763 |

* cited by examiner

*Primary Examiner* — Joshua P Lottich
(74) *Attorney, Agent, or Firm* — Brian J. Colandreo; Mark H. Whittenberger; Holland & Knight LLP

(57) ABSTRACT

A method, computer program product, and computing system for sensing the occurrence of an uncorrectable condition within a data stripe of a RAID array. The data strip includes a plurality of data portions and a parity portion. One or more invalid data portions included within the plurality of data portions are identified. The one or more invalid data portions are populated with filler data having a known pattern, thus defining one or more filler portions. The parity portion is updated based, at least in part, upon the one or more filler portions, thus defining an updated data stripe that includes an updated parity portion.

17 Claims, 4 Drawing Sheets

10

LIMITING DATA LOSS ON PARITY RAID GROUPS

TECHNICAL FIELD

This disclosure relates to storage systems and, more particularly, to systems and methods for safeguarding data.

BACKGROUND

Storing and safeguarding electronic content is of paramount importance in modern business. Accordingly, various systems may be employed to protect such electronic content. Further, in the event of a malfunction, such systems should be able to quickly restore themselves without any data loss.

SUMMARY OF DISCLOSURE

In one implementation, a computer-implemented method includes sensing the occurrence of an uncorrectable condition within a data stripe of a RAID array. The data strip includes a plurality of data portions and a parity portion. One or more invalid data portions included within the plurality of data portions are identified. The one or more invalid data portions are populated with filler data having a known pattern, thus defining one or more filler portions. The parity portion is updated based, at least in part, upon the one or more filler portions, thus defining an updated data stripe that includes an updated parity portion.

One or more of the following features may be included. An intentionally invalid checksum may be defined for each of the one or more filler portions. The occurrence of a degraded condition may sensed within the updated data stripe of the RAID array. The updated data stripe of the RAID array may be restored based, at least in part, upon the updated parity portion. Updating the parity portion based, at least in part, upon the one or more filler portions may include performing an XOR operation on the combination of the filler portions and any valid data portions included within the plurality of data portions. The uncorrectable condition may be the result of one or more of: a drive failure, a media error, and a coherency error. The RAID array may be one of a Raid 3 array and a RAID 5 array.

In another implementation, a computer program product resides on a computer readable medium and has a plurality of instructions stored on it. When executed by a processor, the instructions cause the processor to perform operations including sensing the occurrence of an uncorrectable condition within a data stripe of a RAID array. The data strip includes a plurality of data portions and a parity portion. One or more invalid data portions included within the plurality of data portions are identified. The one or more invalid data portions are populated with filler data having a known pattern, thus defining one or more filler portions. The parity portion is updated based, at least in part, upon the one or more filler portions, thus defining an updated data stripe that includes an updated parity portion.

One or more of the following features may be included. An intentionally invalid checksum may be defined for each of the one or more filler portions. The occurrence of a degraded condition may sensed within the updated data stripe of the RAID array. The updated data stripe of the RAID array may be restored based, at least in part, upon the updated parity portion. Updating the parity portion based, at least in part, upon the one or more filler portions may include performing an XOR operation on the combination of the filler portions and any valid data portions included within the plurality of data portions. The uncorrectable condition may be the result of one or more of: a drive failure, a media error, and a coherency error. The RAID array may be one of a Raid 3 array and a RAID 5 array.

In another implementation, a computing system including a processor and memory is configured to perform operations including sensing the occurrence of an uncorrectable condition within a data stripe of a RAID array. The data strip includes a plurality of data portions and a parity portion. One or more invalid data portions included within the plurality of data portions are identified. The one or more invalid data portions are populated with filler data having a known pattern, thus defining one or more filler portions. The parity portion is updated based, at least in part, upon the one or more filler portions, thus defining an updated data stripe that includes an updated parity portion.

One or more of the following features may be included. An intentionally invalid checksum may be defined for each of the one or more filler portions. The occurrence of a degraded condition may sensed within the updated data stripe of the RAID array. The updated data stripe of the RAID array may be restored based, at least in part, upon the updated parity portion. Updating the parity portion based, at least in part, upon the one or more filler portions may include performing an XOR operation on the combination of the filler portions and any valid data portions included within the plurality of data portions. The uncorrectable condition may be the result of one or more of: a drive failure, a media error, and a coherency error. The RAID array may be one of a Raid 3 array and a RAID 5 array.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
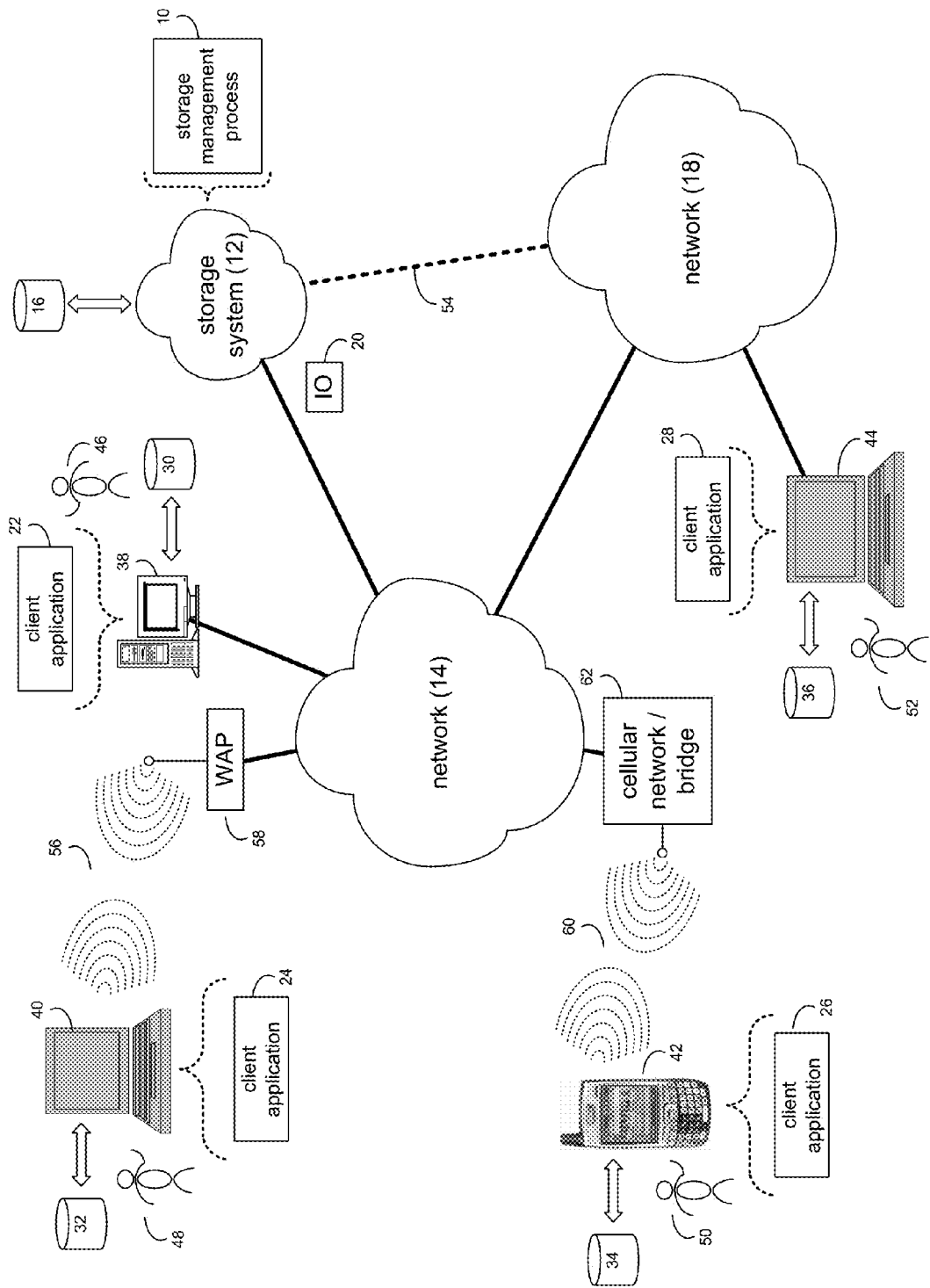
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
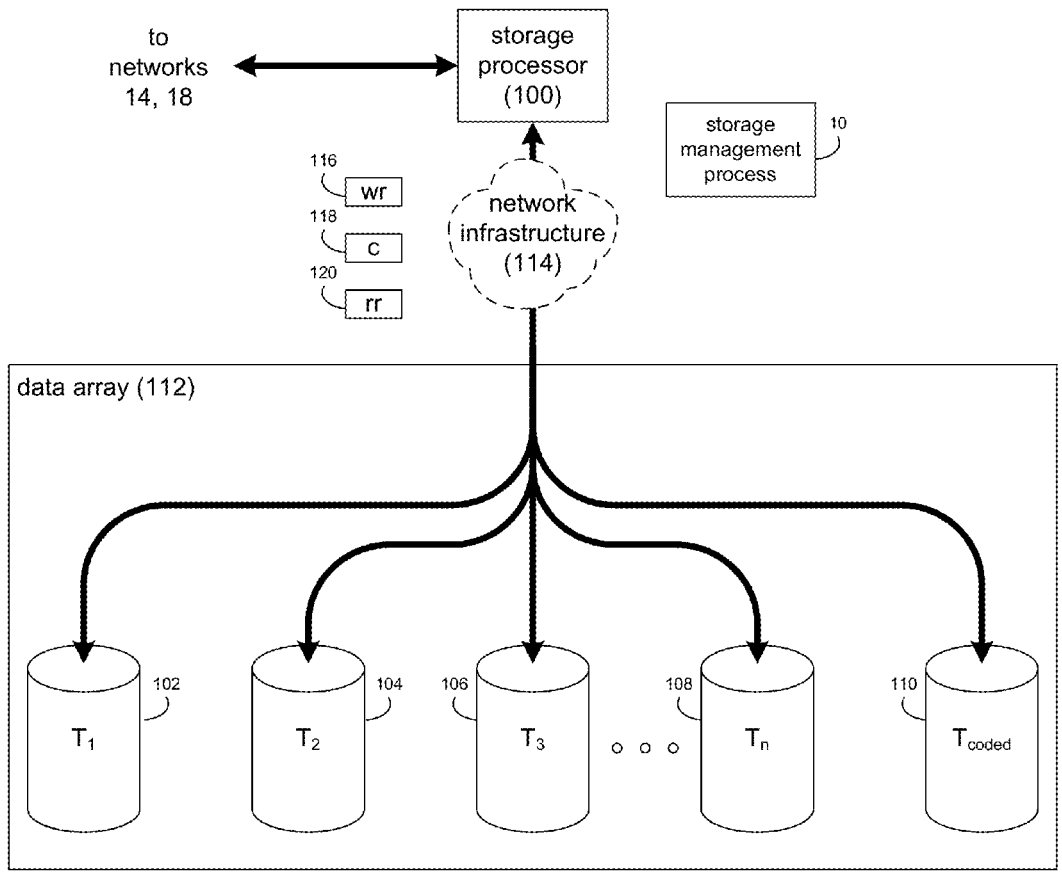
FIG. 2 is a diagrammatic view of the storage system of FIG. 1.

Referring also to FIG. 2, storage system 12 may include storage processor 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/Flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 3:
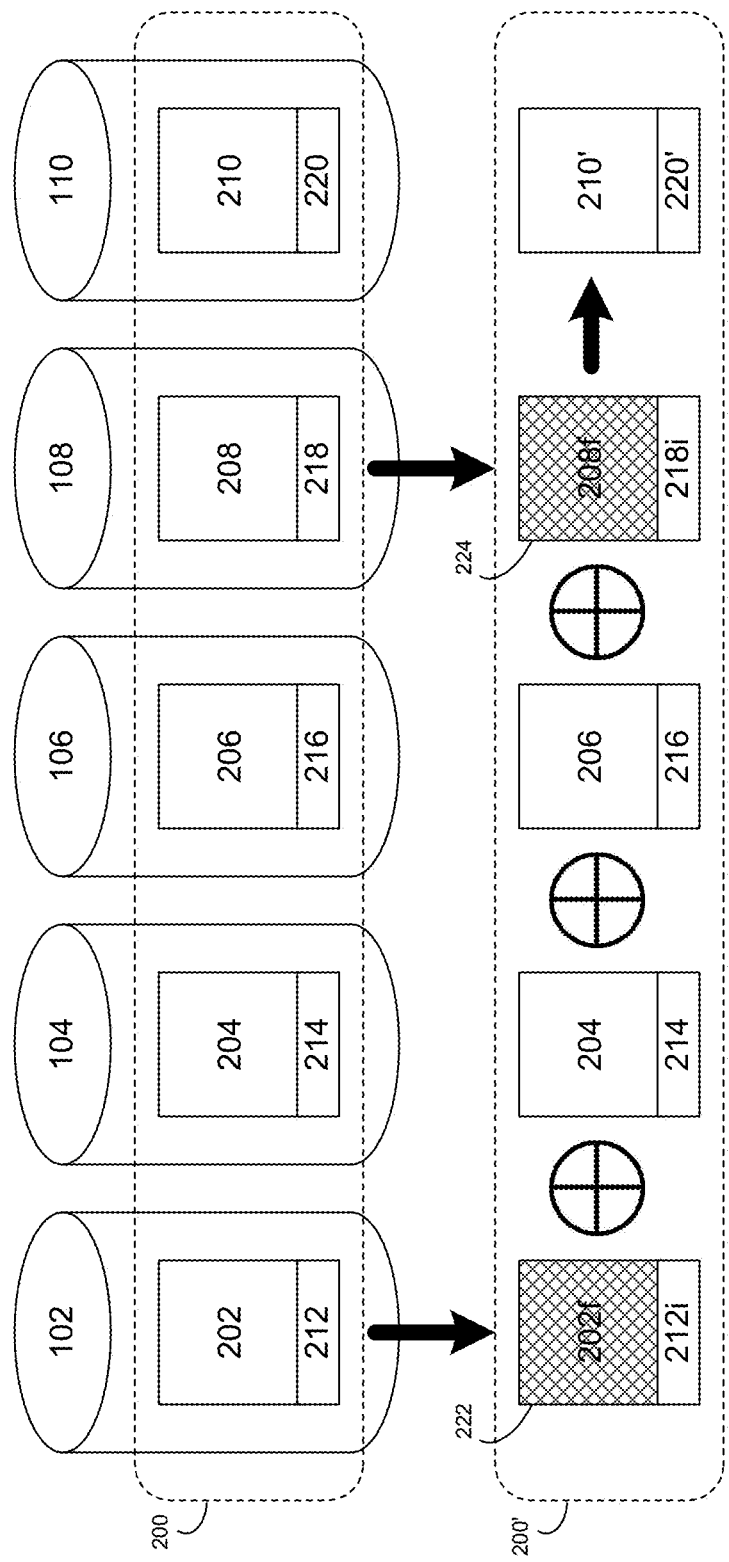
FIG. 3 is a diagrammatic view of the data array of FIG. 2.

The Storage Management Process:

Referring also to FIG. 3, when data (e.g., content 118) is stored within storage system 12 by storage management process 10, this data may be written in data stripes that span across storage targets included within data array 112. For example, data stripe 200 may be written so that (in this example) it spans the five targets, namely storage targets 102, 104, 106, 108 and coded target 110. For this particular example, assume that data array 112 is configured in a RAID 3 or RAID 5 format.

Further, while in this particular example, coded target 110 will be discussed as being the target that contains the parity data for data array 112, other configurations are possible and are considered to be within the scope of this disclosure. For example, such parity data may be distributed across multiple targets, wherein no one specific target exclusively functions as the coded target. For example, the parity data for a first data stripe may be stored on target 110; the parity data for a second data stripe may be stored on target 108; the parity data for a third data stripe may be stored on target 106; the parity data for a fourth data stripe may be stored on target 104; and the parity data for a fifth data stripe may be stored on target 102.

Data stripe 200 may include a plurality of portions (e.g., portions 202, 204, 206, 208, 210), wherein one portion is written to each of the storage targets. An example of such portions may include data blocks. For this example, assume that portions 202, 204, 206, 208 are data portions and portion 210 is a parity portion.

When constructing parity portion 210, storage management process 10 may perform an XOR operation on the combination of data portions 202, 204, 206, 208 (e.g., parity portion 210 may be equal to data portion 202 $\oplus$ data portion 204 $\oplus$ data portion 206 $\oplus$ data portion 208). As is known in the art, in the event that a data portion is lost/corrupted/invalid (e.g., one of data portions 202, 204, 206, 208), the parity portion may be utilized to restore the lost/corrupted/invalid data portion. For example, if data portion 202 is lost/corrupted/invalid, data portion 202 may be restored via another XOR operation (e.g., data portion 202=data portion 204 $\oplus$ data portion 206 $\oplus$ data portion 208 $\oplus$ parity portion 210).

Accordingly, as data (e.g., content 118) is written to data array 112, storage management process 10 divides this data into the above-described data portions, from which the above-described parity portion is calculated, and these data portions and parity portion are written to data array 112 as data stripes. Storage management process 10 may also calculate a checksum for each of data portions 202, 204, 206, 208 and parity portion 210. These checksums (e.g., checksums 212, 214, 216, 218, 220) may be appended to/included within data portions 202, 204, 206, 208 and parity portion 210. In the event that one or more of data portions 202, 204, 206, 208 and parity portion 210 are read/retrieved by storage management process 10, storage management process 10 may first compare these checksums (e.g., checksums 212, 214, 216, 218, 220) to their related portion (e.g., data portions 202, 204, 206, 208 and parity portion 210 respectively) to confirm that the data included within these portions is indeed valid.

Unfortunately, during operation of storage system 12, events may occur that result in one or more of the above-described data stripes being damaged. For example, if storage target 102 (e.g., a hard disk drive) is no longer operable due to a failed motor, data portion 202 may be invalid. If, when trying to read data portion 204 from storage target 104, it is determined that the checksum does not match the data portion, data portion 204 may be invalid. Additionally, if there is e.g., a power failure when writing data stripe 200, there may be a coherency problem in the data stripe. For example, suppose data portions 202, 204, 206 and parity portion 210 were completely written. However, data portion 208 was not written before the power failure. Accordingly, data portions 202, 204, 206 and parity portion 210 may be a newer version than data portion 208. Accordingly, data portion 208 may be invalid.

In the first two scenarios (i.e., a failed storage target and a checksum mismatch), the invalid data portion may be recoverable via the XOR operation described above. In the third scenario (i.e., a coherency problem), the invalid (i.e., older version) data portion may be obtained from cache memory included within e.g., storage processor 100.

However, problems may occur when more portions are unavailable than recoverable. In a RAID 3 configuration or a RAID 5 configuration, if two portions are unavailable, an uncorrectable condition has occurred, as the above-described XOR operation cannot recover more than one invalid portion. Examples of such an uncorrectable condition in a RAID 3 configuration or a RAID 5 configuration may include: two data portions being unavailable (e.g., this may occur due to target failures and/or checksum mismatches); or a data portion and a parity portion being unavailable (e.g., this may occur when the parity portion is invalid due to the coherency situation discussed above and a target failure/checksum mismatch also occurs). Assume for illustrative purposes that upon storage management process 10 attempting to read data stripe 200, it is determined that storage target 108 has failed (resulting in data portion 208 being invalid) and data portion 202 has a checksum error (resulting in data portion 202 being invalid). Accordingly, data stripe 200 is deemed to be in an uncorrectable condition.

Figure 4:
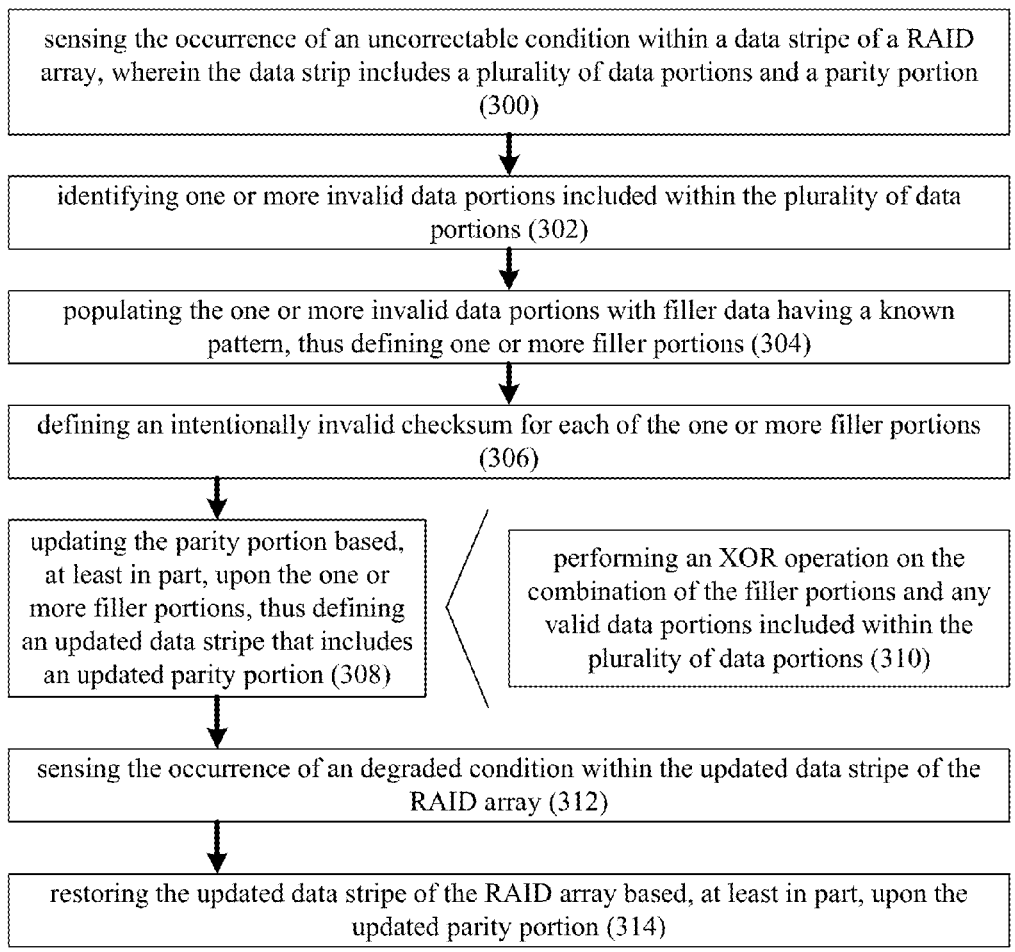
FIG. 4 is a flow chart of one implementation of the storage management process of FIG. 1.

Referring also to FIG. 4 and upon sensing 300 the occurrence of this uncorrectable condition within respect to data stripe 200, storage management process 10 may identify 302 one or more invalid data portions included within the plurality of data portions included within data stripe 200. As discussed and in this particular example, the invalid data portions are data portions 202, 208.

Accordingly, storage management process 10 may populate 304 the one or more invalid data portions (e.g., data portions 202, 208) with filler data (e.g., filler data 222, 224) having a known pattern, thus defining one or more filler portions (e.g., filler portions 202f, 208f respectively). For example, storage management process 10 may write into data portions 202, 208 the same (and known) data pattern that storage management process 10 may use to indicate that a data portion had previously included e.g., invalid/corrupted/unreadable data.

Additionally, storage management process 10 may define 306 an intentionally invalid checksum (e.g., invalid checksum 212i, 218i) for each of the one or more filler portions (e.g., filler portions 202f, 208f respectively). Specifically, storage management process 10 may intentionally define 306 a checksum (e.g., invalid checksum 212i, 218i) for each of filler portions 202f, 208f (respectively) that does not match the filler data (e.g., filler data 222, 224, respectively) included within those filler portions. As discussed above, when the data portions and parity portion within a data stripe are read/retrieved by storage management process 10, storage management process 10 may first compare the checksums associated with these portions to the data included in the related portion to confirm that the data included within those portions is valid. Accordingly, in the event that storage management process 10 attempts to read filler portions 202f, 208f, storage management process 10 will determine that filler portions 202f, 208f contain invalid data, as the checksums (e.g., invalid checksum 212i, 218i respectively) associated with these filler portions do not match the filler data (e.g., filler data 222, 224) included within these filler portions (e.g., filler portions 202f, 2080.

Further, storage management process 10 may update 308 parity portion 210 based, at least in part, upon the one or more filler portions (e.g., filler portions 202f, 2080, thus defining an updated data stripe (e.g., data stripe 200') that includes an updated parity portion (e.g., updated parity portion 210' having updated checksum 220'). When updating 308 parity portion 210, storage management process 10 may perform 310 an XOR operation on the combination of filler portions 202f, 208f and any valid data portions (e.g., data portions 204, 206) included within the plurality of data portions of (in this example) data stripe 200'. For example, storage management process 10 may define updated parity portion 210' as the result of filler portion 202f ⊕ data portion 204 ⊕ data portion 206 ⊕ filler portion 208f.

Accordingly, since updated parity portion 210' is based (at least in part) upon filler data 222, 224 included within filler portions 202f, 208f, in the event that another data portion is lost (e.g., data portion 204, 206), the lost data portion may be recovered using the above-described XOR operation.

Assume for illustrative purposes that target 106 (which contains data portion 206) fails, resulting in data portion 206 being invalid. Accordingly, storage management process 10 may sense 312 the occurrence of this "degraded condition" of updated data stripe 200'. Accordingly and after sensing 312 such an occurrence, storage management process 10 may restore 314 updated data stripe 200' based, at least in part, upon updated parity portion 210'. Specifically, storage management process 10 may restore 314 data portion 206 by determining the result of filler portion 202f ⊕ data portion 204 ⊕ filler portion 208f ⊕ updated parity portion 210'.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    sensing the occurrence of an uncorrectable condition within a data stripe of a RAID array, wherein the data stripe includes a plurality of data portions and a parity portion;
    identifying one or more invalid data portions included within the plurality of data portions;
    populating the one or more invalid data portions with filler data having a known pattern, thus defining one or more filler portions;
    defining an intentionally invalid checksum for each of the one or more filler portions; and
    updating the parity portion based, at least in part, upon the one or more filler portions, thus defining an updated data stripe that includes an updated parity portion.

2. The computer-implemented method of claim 1 further comprising:
    sensing the occurrence of an degraded condition within the updated data stripe of the RAID array.

3. The computer-implemented method of claim 2 further comprising:
    restoring the updated data stripe of the RAID array based, at least in part, upon the updated parity portion.

4. The computer-implemented method of claim 1 wherein updating the parity portion based, at least in part, upon the one or more filler portions includes:
    performing an XOR operation on the combination of the filler portions and any valid data portions included within the plurality of data portions.

5. The computer-implemented method of claim 1 wherein the uncorrectable condition is the result of one or more of: a drive failure, a media error, and a coherency error.

6. The computer-implemented method of claim 1 wherein the RAID array is one of a Raid 3 array and a RAID 5 array.

7. A computer program product residing on a non-transitory computer readable medium having a plurality of instructions stored thereon which, when executed by a processor, cause the processor to perform operations comprising:
    sensing the occurrence of an uncorrectable condition within a data stripe of a RAID array, wherein the data stripe includes a plurality of data portions and a parity portion;
    identifying one or more invalid data portions included within the plurality of data portions;

populating the one or more invalid data portions with filler data having a known pattern, thus defining one or more filler portions;

defining an intentionally invalid checksum for each of the one or more filler portions; and updating the parity portion based, at least in part, upon the one or more filler portions, thus defining an updated data stripe that includes an updated parity portion.

8. The computer program product of claim 7 further comprising instructions for performing operations including:

sensing the occurrence of an degraded condition within the updated data stripe of the RAID array.

9. The computer program product of claim 8 further comprising instructions for performing operations including:

restoring the updated data stripe of the RAID array based, at least in part, upon the updated parity portion.

10. The computer program product of claim 7 wherein updating the parity portion based, at least in part, upon the one or more filler portions includes:

performing an XOR operation on the combination of the filler portions and any valid data portions included within the plurality of data portions.

11. The computer program product of claim 7 wherein the uncorrectable condition is the result of one or more of: a drive failure, a media error, and a coherency error.

12. The computer program product of claim 7 wherein the RAID array is one of a Raid 3 array and a RAID 5 array.

13. A computing system including a processor and memory configured to perform operations comprising:

sensing the occurrence of an uncorrectable condition within a data stripe of a RAID array, wherein the data stripe includes a plurality of data portions and a parity portion;

identifying one or more invalid data portions included within the plurality of data portions;

populating the one or more invalid data portions with filler data having a known pattern, thus defining one or more filler portions;

defining an intentionally invalid checksum for each of the one or more filler portions; and updating the parity portion based, at least in part, upon the one or more filler portions, thus defining an updated data stripe that includes an updated parity portion.

14. The computing system of claim 13 further configured to perform operations comprising:

sensing the occurrence of an degraded condition within the updated data stripe of the RAID array.

15. The computing system of claim 14 further configured to perform operations comprising:

restoring the updated data stripe of the RAID array based, at least in part, upon the updated parity portion.

16. The computing system of claim 13 wherein updating the parity portion based, at least in part, upon the one or more filler portions includes:

performing an XOR operation on the combination of the filler portions and any valid data portions included within the plurality of data portions.

17. The computing system of claim 13 wherein the uncorrectable condition is the result of one or more of: a drive failure, a media error, and a coherency error.

* * * * *